(12) United States Patent
Fung

(10) Patent No.: US 9,917,794 B2
(45) Date of Patent: Mar. 13, 2018

(54) REDIRECTION IP PACKET THROUGH SWITCH FABRIC

(71) Applicant: Luxar Tech, Inc., Fremont, CA (US)

(72) Inventor: Hei Tao Fung, Fremont, CA (US)

(73) Assignee: LUXAR TECH, INC, Fremont, CA (US)

( * ) Notice: Subject to any disclaimer, the term of this patent is extended or adjusted under 35 U.S.C. 154(b) by 114 days.

(21) Appl. No.: 15/132,156

(22) Filed: Apr. 18, 2016

(65) Prior Publication Data

US 2017/0048154 A1  Feb. 16, 2017

Related U.S. Application Data

(60) Provisional application No. 62/203,538, filed on Aug. 11, 2015.

(51) Int. Cl.

| | | |
|---|---|---|
| *H04L 29/06* | (2006.01) | |
| *H04L 12/947* | (2013.01) | |
| *H04L 12/721* | (2013.01) | |
| *H04L 12/741* | (2013.01) | |
| *H04L 12/933* | (2013.01) | |

(52) U.S. Cl.
CPC .............. *H04L 49/25* (2013.01); *H04L 45/66* (2013.01); *H04L 45/745* (2013.01); *H04L 49/15* (2013.01)

(58) Field of Classification Search
CPC ....... H04L 49/25; H04L 45/66; H04L 45/745; H04L 49/15
See application file for complete search history.

(56) References Cited

U.S. PATENT DOCUMENTS

| | | | |
|---|---|---|---|
| 2006/0120517 A1* | 6/2006 | Moon | .................... H04M 11/04 379/45 |
| 2011/0026403 A1* | 2/2011 | Shao | ................... H04L 67/2895 370/235 |
| 2012/0224486 A1* | 9/2012 | Battestilli | .............. H04L 47/125 370/237 |
| 2015/0188770 A1* | 7/2015 | Naiksatam | .......... H04L 41/0893 370/254 |

* cited by examiner

*Primary Examiner* — Abdelnabi O Musa

(57) ABSTRACT

A method for redirecting Internet Protocol (IP) packets from a packet redirect source to a packet redirect destination through a switch fabric of Ethernet switches is disclosed. At the packet redirect source, the topological location and the identifier of the packet redirect destination are put in a first set of bits and a second set of bits of the destination Media Access Control (MAC) address field of the packet to be redirected. The switch fabric forwards the packet to the switch directly connected to the packet redirect destination according to the first set of bits. Then the switch forwards the packet to the packet redirect destination according to the second set of bits.

20 Claims, 10 Drawing Sheets

| rules | match key | instructions |
|---|---|---|
| ... | ... | ... |
| 11 | ((DMAC & fe:ff:ff:ff:00:00) = 02:00:00:00:00:00) && (SMAC = 00:00:2d:12:34:56) && (IngressPort = 1) | Go to MAC-based forwarding rules table |
| 12 | ((DMAC & fe:ff:ff:ff:00:00) = 02:00:00:01:00:00) && (SMAC = 00:00:3b:12:6a:3b) && (IngressPort = 4) | Go to MAC-based forwarding rules table |
| 13 | Any | Discard |
| ... | ... | ... |

Security rules table 55

| rules | match key | instructions |
|---|---|---|
| ... | ... | ... |
| 20 | ((DMAC & fe:ff:ff:ff:00:ff) = 02:00:00:00:00:01) && (EtherType = 0x0800) | Set VRF = 0; go to IP-based forwarding rules table |
| 21 | ((DMAC & fe:ff:ff:ff:00:ff) = 02:00:00:01:00:01) && (EtherType = 0x0800) | Set VRF = 1; go to IP-based forwarding rules table |
| 22 | (DMAC & fe:00:00:00:00:ff) = 02:00:00:00:00:00 | Egress on port 2; decrement TTL; do TTL check |
| 23 | (DMAC & fe:00:00:00:00:fe) = 02:00:00:00:00:02 | Egress on port 3; decrement TTL; do TTL check |
| 24 | (DMAC & fe:00:00:00:00:fc) = 02:00:00:00:00:04 | Egress on port 3; decrement TTL; do TTL check |
| ... | ... | ... |

MAC-based forwarding rules table 56

| rules | match key | instructions |
|---|---|---|
| ... | ... | ... |
| 30 | (VRF = 1) && ((DIP & 255.255.255.255) = 10.0.0.2) | Egress on port 4; replace DMAC by 00:00:3b:12:6a:3b; replace SMAC by 00:00:5e:00:01:01; decrement TTL; do TTL check |
| 31 | (VRF = 0) && ((DIP & 255.255.255.255) = 10.0.0.2) | Egress on port 1; replace DMAC by 00:00:2d:12:34:56; replace SMAC by 00:00:5e:00:01:01; decrement TTL; do TTL check |
| 32 | (VRF = 0) && ((DIP & 0.0.0.0) = 0.0.0.0) | Egress on port 2; replace DMAC by 02:00:00:00:00:02; decrement TTL; do TTL check |
| 33 | (VRF = 1) && ((DIP & 255.255.255.255) = 10.2.0.2) | Egress on port 3; replace DMAC by 02:00:00:01:00:03; decrement TTL; do TTL check |
| ... | ... | ... |

IP-based forwarding rules table 57

FIG. 5

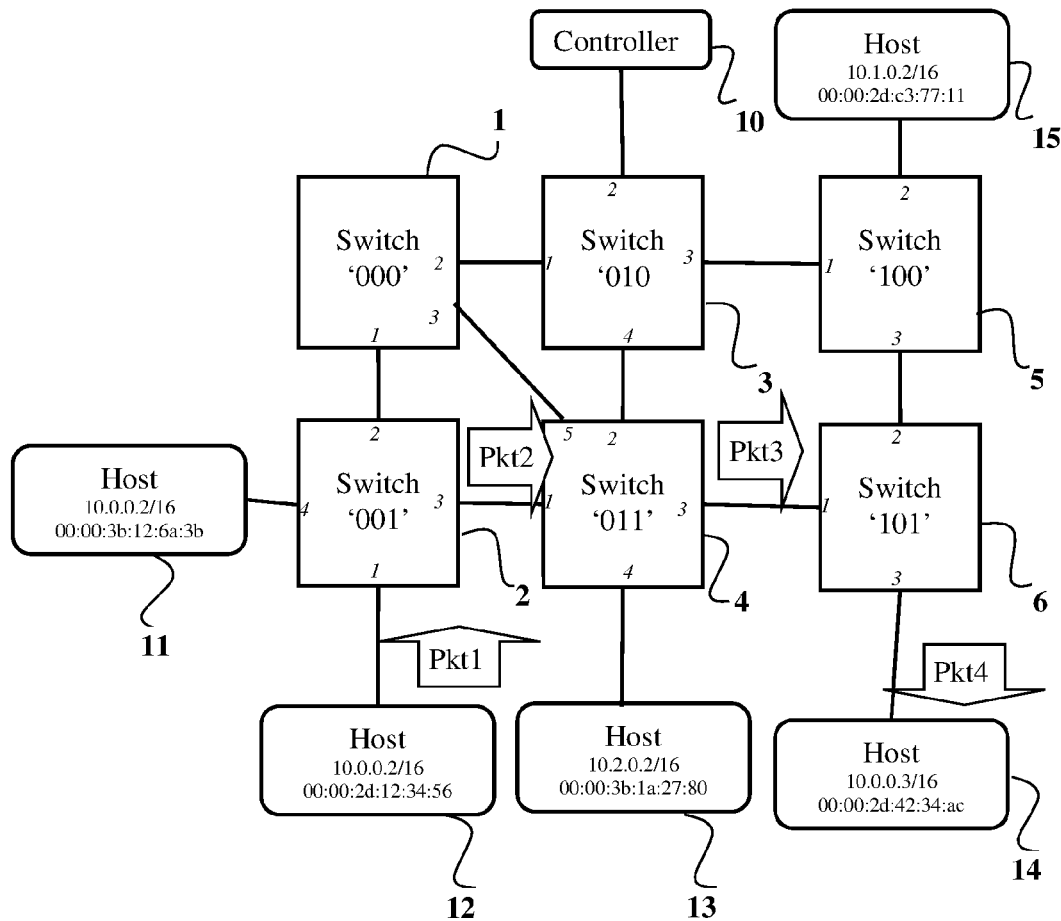
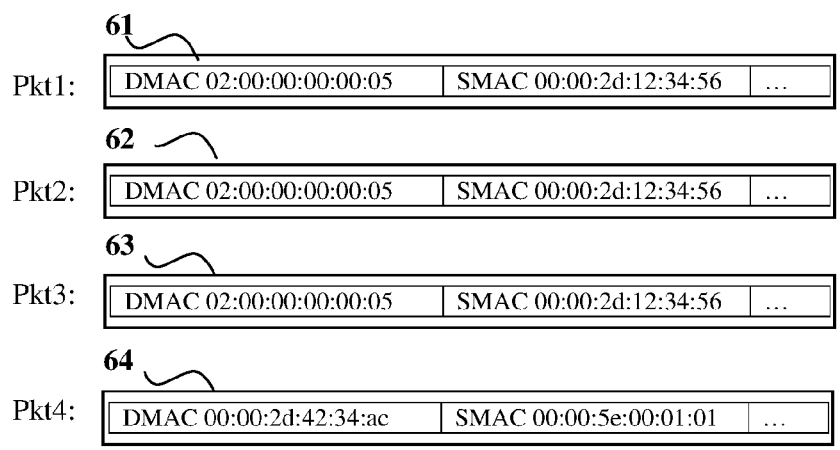
FIG. 6

| rules | match key | instructions |
|---|---|---|
| ... | ... | ... |
| 13 | ((DMAC & fe:ff:ff:ff:00:00) = 02:00:00:00:00:00) && (SMAC = 00:00:2d:42:34:ac) && (IngressPort = 3) | Go to MAC-based forwarding rules table |
| ... | ... | ... |
| ... | ... | ... |
| ... | ... | ... |
| 999 | Any | Discard |
| ... | ... | ... |

Security rules table — 95

| rules | match key | instructions |
|---|---|---|
| ... | ... | ... |
| 15 | ((DMAC & fe:00:00:00:ff:ff) = 02:00:00:00:01:05) | Egress on port 3; replace DMAC by 00:00:2d:42:34:ac |
| 25 | ((DMAC & fe:ff:ff:ff:00:ff) = 02:00:00:00:00:05) && (EtherType = 0x0800) | Set VRF = 0; go to IP-based forwarding rules table |
| 26 | (DMAC & fe:00:00:00:00:fe) = 02:00:00:00:00:00 | Egress on port 1; decrement TTL; do TTL check |
| 27 | (DMAC & fe:00:00:00:00:fe) = 02:00:00:00:00:02 | Egress on port 1; decrement TTL; do TTL check |
| 28 | (DMAC & fe:00:00:00:00:ff) = 02:00:00:00:00:04 | Egress on port 2; decrement TTL; do TTL check |

MAC-based forwarding rules table — 96

| rules | match key | instructions |
|---|---|---|
| ... | ... | ... |
| 31 | (VRF = 0) && ((DIP & 255.255.255.255) = 10.0.0.3) | Egress on port 3; replace DMAC by 00:00:2d:42:34:ac; replace SMAC by 00:00:5e:00:01:01; decrement TTL; do TTL check |
| ... | ... | ... |

IP-based forwarding rules table — 97

FIG. 9

REDIRECTION IP PACKET THROUGH SWITCH FABRIC

FIELD OF THE INVENTION

This application related to computer networking and more particularly to redirecting an Internet Protocol (IP) packet from a packet redirect source to a packet redirect destination through a switch fabric.

BACKGROUND

Most high-capacity routers today are chassis-based systems. A typical chassis-based router has a number of slots where router modules can be plugged into, and the router modules are interconnected via a backplane or mid-plane fabric of the chassis. The scalability of the system is therefore limited by the number of slots provisioned and the capacity of the backplane or mid-plane fabric.

Software defined networking (SDN) is an approach to building a computer network that separates and abstracts elements of the networking systems. It has become more important with the emergence of compute virtualization where virtual machines (VMs) may be dynamically spawned or moved, to which the network needs to quickly respond. Also driven by popularity of compute virtualization, network virtualization addresses the need of separating the IP address space of tenants in a multi-tenant data center network.

SDN decouples the system that makes decisions about where traffic is sent (i.e., the control plane) from the system that forwards traffic to the selected destination (i.e., the data plane). OpenFlow is a communications protocol that enables a controller (i.e., the control plane) to access and configure the switches (i.e., the data plane).

We have disclosed a system and method of using commodity OpenFlow Ethernet switches to produce a switch fabric. Such a switch fabric can be used to redirect IP packets from a packet redirect source to a packet redirect destination. For example, a packet redirect source has captured some IP packets and would like to redirect them to a packet redirect destination for network traffic analysis. Redirecting a packet in this disclosure means that an IP packet is not forwarded according to the destination IP address of the packet; instead, it is to be forwarded to the packet redirect destination. In this invention, we disclose a method of redirecting IP packets through the switch fabric disclosed or a switch fabric of similar forwarding characteristics.

SUMMARY OF THE INVENTION

An object of the invention is to enable redirection of IP packets from a packet redirect source to a packet redirect destination through a switch fabric of Ethernet switches.

In this disclosure, our exemplary switch fabric system comprises a plurality of switches. The switches can be connected in any topology. Hosts can be connected to the switch fabric on any switch on any port. The hosts can be physical machines as well as virtual machines and even networking devices. A host in our context is just a target recipient of an Internet Protocol (IP) packet.

The switch fabric system also comprises a controller. The controller conveys forwarding rules onto the switches. The switches process packets by the forwarding rules.

In the switch fabric of this disclosure, packets are routed according to destination Media Access Control (MAC) addresses of the packets, and those MAC addresses are crafted and assigned to the switches.

In a traditional learning switch network, a MAC address uniquely identifies a network interface of a host. A MAC address consists of a three-byte Organizationally Unique Identifier (OUT) and a three-byte number assigned by the vendor who owns a specific OUT number and manufactures the network interface card (NIC). MAC addresses of hosts are learned on switch ports, and packets are forwarded by destination MAC addresses of the packets without interpreting meanings of the MAC addresses.

In the switch fabric of this disclosure, each switch is assigned a MAC address that has meaning. The MAC address comprises a set of bits identifying the switch in the switch fabric, and the set of bits, in our preferred embodiment, identifies the topological location of the switch in the switch fabric. When forwarding a packet, the set of bits is used to find an egress port along a path in the switch fabric that leads to the switch. Also, the MAC address may further comprise a set of bits identifying the virtualized IP address space that belongs to a host. Furthermore, to support packet redirection, the MAC address may further comprise a set of bits identifying the packet redirect destination.

In this disclosure, hosts attached to the system require no change to its networking software stack. Specifically, a host sends Address Resolution Protocol (ARP) requests for target hosts, including computers and routers, and expects ARP replies that provide MAC addresses of the target hosts. The controller or a switch in our switch fabric intercepts the ARP requests and responds with ARP replies that provide MAC addresses of the switches that can reach the target hosts. Similarly, for an IPv6 host, a host sends Neighbor Solicitation messages for target hosts, including computers and routers, and expects Neighbor Advertisement messages that provide MAC addresses of the target hosts. The controller or a switch in our switch fabric intercepts the Neighbor Solicitation messages and responds with Neighbor Advertisement messages that provide MAC addresses of the switches that can reach the target hosts.

In a traditional IP router network, an IP packet is forwarded by destination IP address of the IP packet from one router to the next router towards the final router that has the target host attached to it. From one router to the next router, the destination MAC address of the IP packet is replaced by the MAC address of the next router and the source MAC address of the IP packet by the MAC address of the current router. At the final router, the destination MAC address of the IP packet is replaced by the MAC address of the target host and the source MAC address of the IP packet by the MAC address of the final router.

In this disclosure, when an IP packet is targeting a host on the same IP subnet, the destination and source MAC addresses of the IP packet do not need to be changed from one switch to the next switch. At the final switch, the destination MAC address of the IP packet is replaced by the MAC address of the target host. The source MAC address of the IP packet is immaterial in the forwarding process.

In the current invention about packet redirection, there is a packet redirect source and a packet redirect destination. The packet redirect source can be implemented on a host or on a switch. Similarly, the packet redirect destination can be implemented on a host or on a switch. The invention enables redirection of IP packets from the packet redirect source through the switch fabric to the packet redirect destination. One solution is to encapsulate an IP packet to be redirected in another IP header where the outer IP header contains the IP address of the packet redirect destination. That solution incurs an overhead in the redirected packet. The solution of the current invention is to use two sets of bits in the destination MAC address field of the redirected packet to store the information about the packet redirect destination such that the switch fabric is able to forward the packet to the switch directly connected the packet redirect destination according to the first set of bits of the destination MAC address field. Then, according to the second set of bits of the destination MAC address field, the switch directly connected to the packet redirect destination replaces the destination MAC address field of the packet by the original MAC address of the packet redirect destination and sends out the packet to an egress port directly connected to the packet redirect destination. There is no overhead introduced to the redirected packet. The method works for the switch fabric in this disclosure and other switch fabric solutions that have similar forwarding characteristics.

BRIEF DESCRIPTION OF THE DRAWINGS/FIGURES

The present disclosure will be understood more fully from the detailed description that follows and from the accompanying drawings, which however, should not be taken to limit the disclosed subject matter to the specific embodiments shown, but are for explanation and understanding only.

FIG. 5 illustrates an embodiment of packet handling rules on a switch.

FIG. 6 illustrates the effects on a packet destined to a host on the same subnet.

FIG. 9 illustrates an embodiment of packet handling rules on a switch supporting packet redirection.

DETAILED DESCRIPTION OF THE INVENTION

Figure 1:
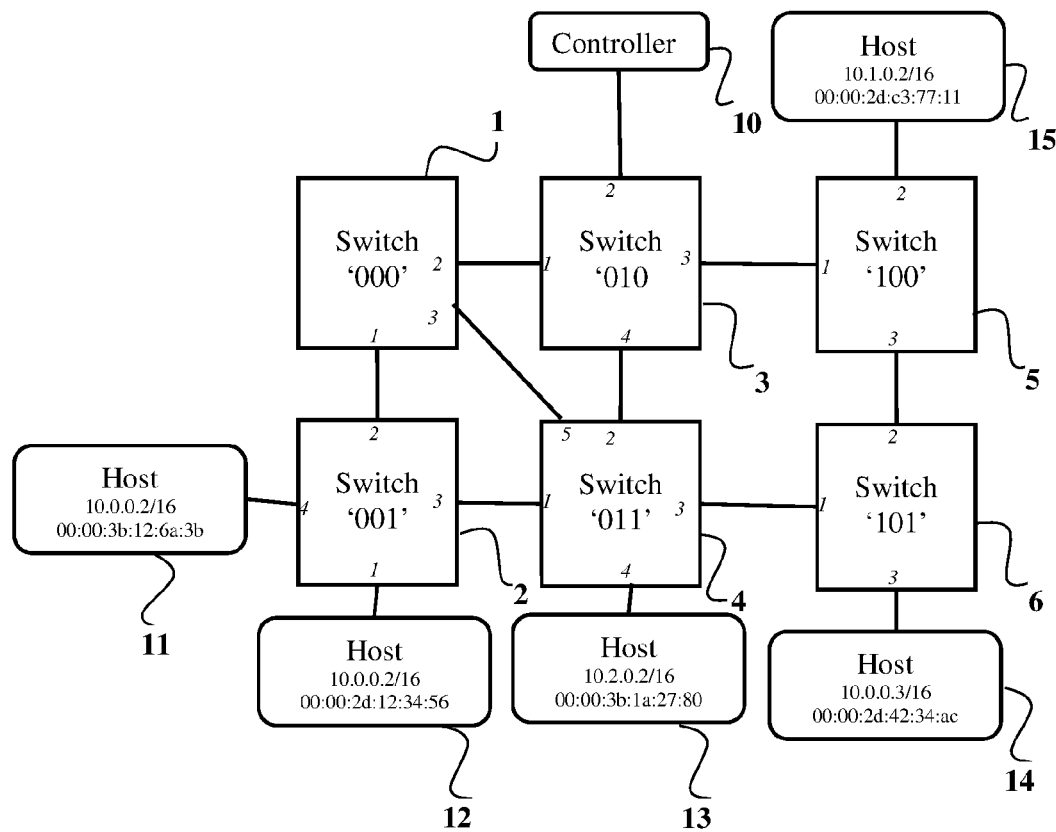
FIG. 1 illustrates an example of a switch fabric.

FIG. 1 illustrates an example of a switch fabric in this invention. The system comprises a plurality of switches and a controller. Like a typical SDN controller, the controller establishes a control session to each switch in the switch fabric. We consider that switches having control sessions to the controller being part of the switch fabric. In FIG. 1, all switches are part of the switch fabric. (The current invention also works in scenarios where some non-switch-fabric switches may be attached to the switch fabric.) The control sessions can be established over the switch fabric as commonly referred to as in-band connections and also over a separate management network as commonly referred to as out-of-band connections. The controller 10 is able to selectively intercept packets received on a switch through its control session. The controller 10 is also able to inject some packets into a switch through its control session.

Having a centralized controller is a preferred embodiment of the current invention. However, the current invention does not preclude having multiple instances of controllers. They may act in active-active mode or active-standby mode. Moreover, the current invention does not preclude having no centralized controller at all but having the control plane function distributed to each switch, like in a traditional learning switch network or a traditional router network. The method of the current invention can be implemented using centralized controller or distributed controllers.

In FIG. 1, the six switches form a mesh topology and are physical switches. However, the current invention works in any network topology and even works with virtual switches running on hosts that are considered part of the switch fabric.

In the example of FIG. 1, there are five hosts. Hosts 12, 14, and 15 belong to one virtualized IP address space (VIPAS), VIPAS 0. Hosts 11 and 13 belong to another VIPAS, VIPAS 1. Though host 11 and host 12 have the same IP address 10.0.0.2, there is no conflict. Host 12 and host 14 are on the same subnet 10.0.0.0/16. Host 15 is on a different subnet, namely 10.1.0.0/16.

For sake of ease of illustration, we assume IPv4 hosts in FIG. 1. The current invention also works for IPv6 hosts. The address resolution requests and replies in IPv4 involve ARP requests and ARP replies, while the address resolution requests and replies in IPv6 involve Neighbor Solicitation messages and Neighbor Advertisement messages. Also, IPv4 involves TTL, while IPv6 involves hop limit, which is equivalent to TTL.

Figure 2A:
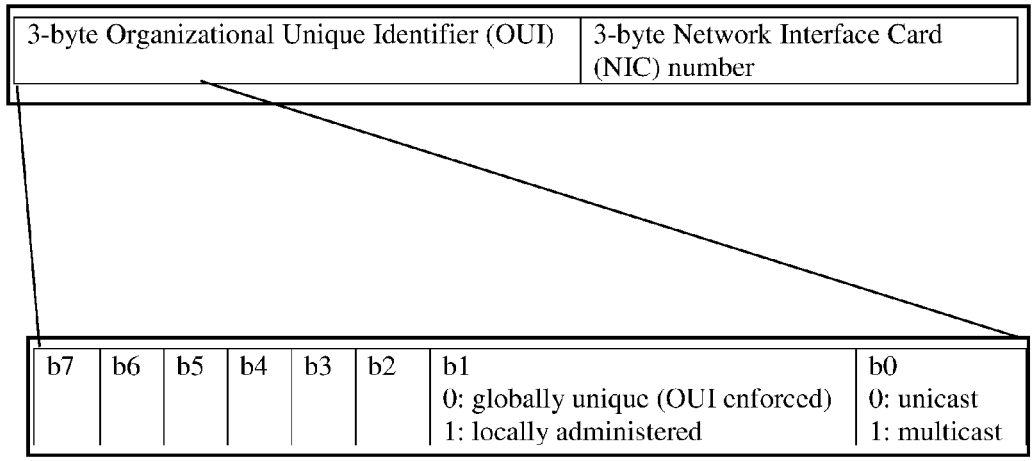
FIG. 2a illustrates the format of a traditional MAC address.

The switch fabric system in this disclosure assigns each switch a MAC address that comprises a location identifier of the switch within the switch fabric. FIG. 2a shows the format of a traditional MAC address. The first three bytes represent an OUT. A hardware vendor is assigned a unique OUT. The second three bytes uniquely identify a NIC manufactured by the hardware vendor. The six-byte MAC address should globally unique identifies a NIC. As can be seen, a traditional MAC address does not contain any location information.

Figure 2B:
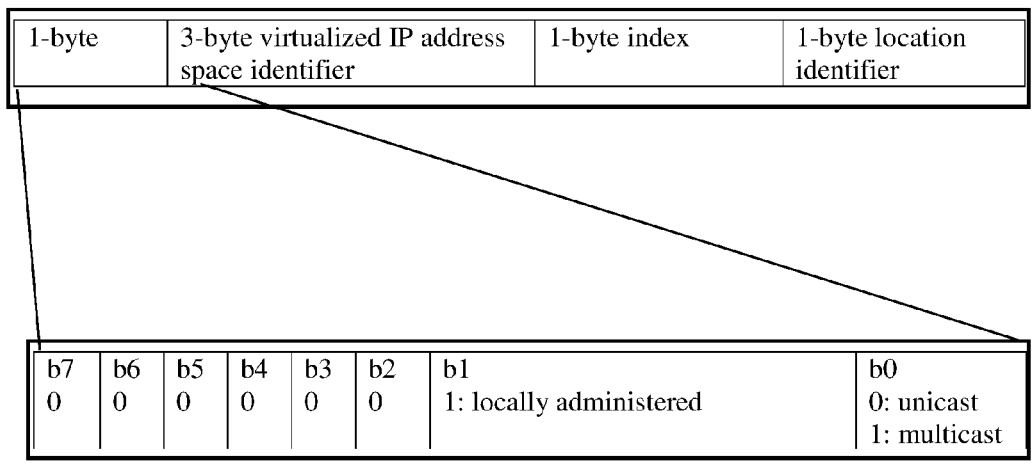
FIG. 2b illustrates an embodiment of special-format MAC address.

FIG. 2b shows one embodiment of a MAC address format in the switch fabric system. First of all, the locally administered bit is set to 1. That signifies a specially crafted MAC address format. A MAC address of such a special format is a logical one. It is assigned to a switch in the switch fabric. It is not assigned to a NIC. It is not assigned to a host (unless a virtual switch in the host is also considered to be part of the switch fabric). The switch is likely to have its own traditional MAC address. The forwarding decision in this switch fabric is based on the special-format MAC address, not the traditional MAC address.

The special-format MAC address comprises a set of bits identifying the switch within the switch fabric. The bits in the set of bits do not have to be contiguous nor structured. In FIG. 2b, the set of bits has eight bits. In our preferred embodiment, the bits in the set of bits are contiguous and form a value. The set of bits is a topological location identifier. The preferred way of assigning values to the set of bits to switches is based on their topological location adjacency. That facilitates bit aggregations in a masked match key when programming the forwarding rules on the switches. For example, in FIG. 1, switch 1 and switch 2 are topologically adjacent. Switch 1 is assigned binary value '000', and switch 2 '001' such that '00X' can refer to both switches, where 'X' means a bit being masked out. By the same token, switch 3 and switch 4 are assigned '010' and '011', respectively. Switches 1, 2, 3, and 4 are topologically adjacent, and '0XX' can refer to them all. Similarly, '10X' can represent switch 5 and switch 6.

The assignment of special-format MAC addresses to the switches can be done programmatically. That is, through topology discovery such as using Link Layer Discovery Protocol (LLDP), the controller may then assign the MAC addresses and inform the switches. (In a distributed control function case, each switch assigns itself a MAC address consistent and non-conflicting with its adjacent neighbors.) Alternatively, the MAC address assignment can be administrator-assisted, and the controller receives the assignment as configurations and acts on it.

In FIG. 2b, the special-format MAC address further comprises a set of bits identifying the virtualized IP address space (VIPAS) that a switch may service. To support network virtualization, the IP address space of one tenant should be separated from the IP address space of another. In FIG. 1, the switch fabric is serving two tenants. The set of VIPAS identifiers is global to the switch fabric, but a switch in the switch fabric may service a subset of the VIPAS identifiers. In our preferred embodiment, a subset of VIPAS identifiers are mapped to the VRF identifiers on a switch. A commodity switch typically has a smaller number of VRF identifiers than the total number of VIPAS identifiers. Yet, a number of switches together can serve the full set of VIPAS identifiers. For example, there are VIPAS identifiers 1-20 serviced by the switch fabric. VRF identifiers 1-16 on one switch are mapped to VIPAS identifiers 1-16, and VRF identifiers 1-16 on another switch are mapped to VIPAS identifiers 5-20. In one embodiment, the special-format MAC address may comprise a VRF identifier of the switch specified by the location identifier. That is, the combination of VRF identifier and location identifier uniquely maps to a VIPAS identifier. Yet in another embodiment, the special-format MAC address comprises no bits about VIPAS. Instead, the VRF identifier of the switch specified by the location identifier is put in the VLAN identifier field of an 802.1Q tag of the packet. Our preferred embodiment, however, has the special-format MAC address comprise the VIPAS identifier. (In all three aforementioned embodiments, the switch identified by the location identifier is able to derive its locally-significant VRF identifier, either from the destination MAC address or the 802.1Q tag of the packet.) The preferred embodiment may result in the least number of security rules programmed onto the switches.

Some commodity switches may not support VRFs. Those switches can be considered as supporting only one VRF. We may still map the implicit VRF of a switch to one of the VIPAS identifiers.

The six most significant bits of the first byte in the special-format MAC address can be used as flags for semantic extensions. They can be set to zeroes for now.

In FIG. 2b, the special-format MAC address further comprises a set of bits representing an index of a packet redirect destination. An index value 0 means not referring to any packet redirect destination. A non-zero index value means that the packet is not to be forwarded to the host corresponding to the destination IP address of the packet. Instead, the packet is to be forwarded to a packet redirect destination indicated by the location identifier bits and the index bits (and even the VIPAS identifier bits).

Figure 2C:
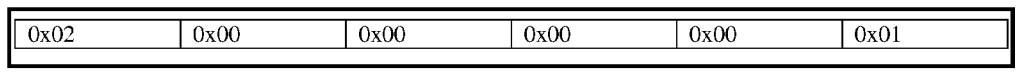
FIG. 2c is an example of a special-format MAC address.

FIG. 2c is an example of a MAC address assigned to switch 2 of FIG. 1. Actually, switch 2 has another MAC address, 02:00:00:01:00:01, because it serves VIPAS identifiers 0 and 1.

Figure 3:
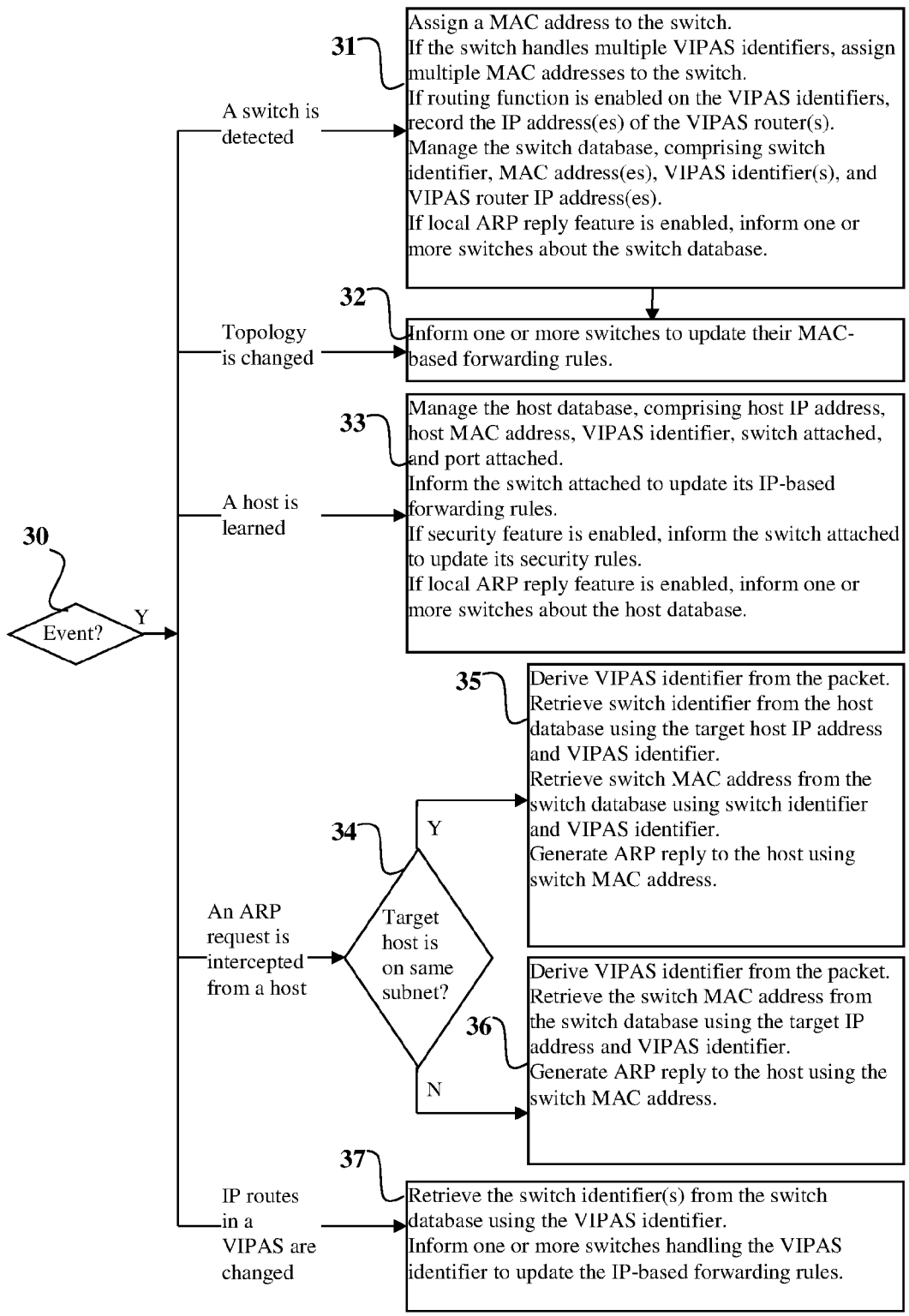
FIG. 3 illustrates an embodiment of event handling on a controller.

FIG. 3 illustrates how a controller may handle events. An embodiment of a controller, which is networking application software running on a host, has an event loop 30 to spawn out handlers according to the events. After an event is handled, the controller waits at the event loop 30 again. The set of events on a controller comprises switch being detected, topology being changed, host being learned, ARP request being intercepted, and IP routes being changed.

When a switch is detected, the controller assigns a special-format MAC address to the switch according to its topological location. If the switch handles multiple VIPAS identifiers, such as switch 2 in FIG. 1, multiple MAC addresses are assigned. Routing between IP subnets in a VIPAS can be supported by a host as a router. Alternatively and preferably, the switch fabric handles the routing between IP subnets in a VIPAS. Not all switches in the switch fabric need to handle the routing between IP subnets. In our preferred embodiment, one or more, but not all, switches are selected to service IP subnet routing for a particular VIPAS. To serve a full set of VIPAS, the IP subnet routing workload can be spread among all or most switches. For example, in FIG. 1, switch 3 is selected to do routing between IP subnets 10.0.0.0/16 and 10.1.0.0/16 for VIPAS identifier 0.

The hosts in a VIPAS are aware of the IP address of its VIPAS router, for example, through router discovery protocol or administrator configurations. When the switch fabric functions as that VIPAS router, the controller needs to know the IP address of that VIPAS router so that it can generate an ARP reply properly in steps 34 and 36. In step 31, the controller manages a switch database, each database entry comprising the switch identifier, the MAC address(es) of the switch, the VIPAS identifier(s) that the switch serves, and the VIPAS router IP address(es). If an ARP reply is to be generated by a switch intercepting an ARP request, then the controller needs to inform the switch about the database.

The appearance of a switch can cause topology change, so step 31 also leads to step 32. When there is a topology change, the controller may sometimes reassign some MAC addresses to some switches. The controller may sometimes inform some switches to update their MAC-based forwarding rules so as to maintain connectivity among hosts and optimal network utilization.

When a host is learned, step 33 is performed. A host may be learned by a switch receiving a packet from the host. A host may also be learned by consulting administrator configuration. The controller maintains a host database, each database entry comprising the host IP address, the host MAC address, the VIPAS identifier of the VIPAS where the host belongs, the switch identifier of the switch where the host is attached, the port identifier of the port where the host is attached. For populating a database entry, the VIPAS identifier may be derived using some default or administrator configurations, the VLAN identifier of the VLAN where the host belongs, and the switch identifier and the port identifier. It is possible that a host is connected to multiple switches or ports. The controller informs the switch where the host is attached about those host data so that the switch can update its IP-based forwarding rules and security rules. If an ARP reply is to be generated by a switch intercepting an ARP request, then the controller needs to inform the switch about the host database.

The switch fabric is supposed to be compatible with existing host networking software stack. A host sends an ARP request to find out the MAC address of the target host, be it a machine or a VIPAS router. The switches in the current invention help the controller intercept ARP requests from hosts. The controller generates ARP replies in response to the intercepted ARP requests. (In another embodiment, the switch that intercepts an ARP request generates the ARP reply.) Steps 35 and 36 enable the hosts to associate the special-format MAC addresses of the switches with the target hosts. In step 35, the controller derives the VIPAS identifier from the VLAN identifier and the ingress switch port of the packet. The controller looks up the switch identifier from the host database using the target host IP address and the VIPAS identifier. Then the controller looks up the switch MAC address from the switch database using the switch identifier looked up from the host database and the VIPAS identifier. The switch MAC address should be the MAC address of the switch where the target host is attached. Then the controller generates the ARP reply using the switch MAC address.

In an alternative embodiment, the controller always replies using the switch MAC of the switch selected to do the IP subnet routing function for the VIPAS identifier. Consequently, all IP packets from the (source) host to any target host in the VIPAS are first forwarded to the switch selected to do IP subnet routing, no matter the target host is in the same subnet or in a different subnet. Such embodiment has the best security characteristics, at the expense of network utilization.

Step 36 handles the case that the switch fabric acts as the VIPAS router. In step 36, the controller derives the VIPAS identifier from the VLAN identifier and the ingress switch port of the packet. The controller obtains the switch MAC address from the switch database using the target IP address, as the VIPAS router IP address, and the VIPAS identifier. The switch MAC address should be the MAC address of the switch selected to perform the IP subnet function for the VIPAS identifier. Then, the controller generates the ARP reply using the switch MAC address.

The administrator or a routing protocol may change the IP subnet routes in a VIPAS. In step 37, the controller finds out the switch(es) selected to do the IP subnet routing function for the VIPAS from the switch database and inform the switch(es) to update its IP-based forwarding rules.

Though we suppose that the host networking software stack is not modified, the switch fabric works when the host networking software stack is modified in such a way that address resolution replies from the switch fabric become unnecessary. For example, in one embodiment, a host's networking software stack is configured with IP address to special-format MAC address mappings. In another embodiment, the destination MAC address of a packet from a host is overwritten with a pre-specified special-format MAC address by the host's networking software stack. In yet another embodiment, the destination MAC address of a packet is deduced from the target host IP address according to a pre-specified mapping function at the host's networking software stack.

Figure 4:
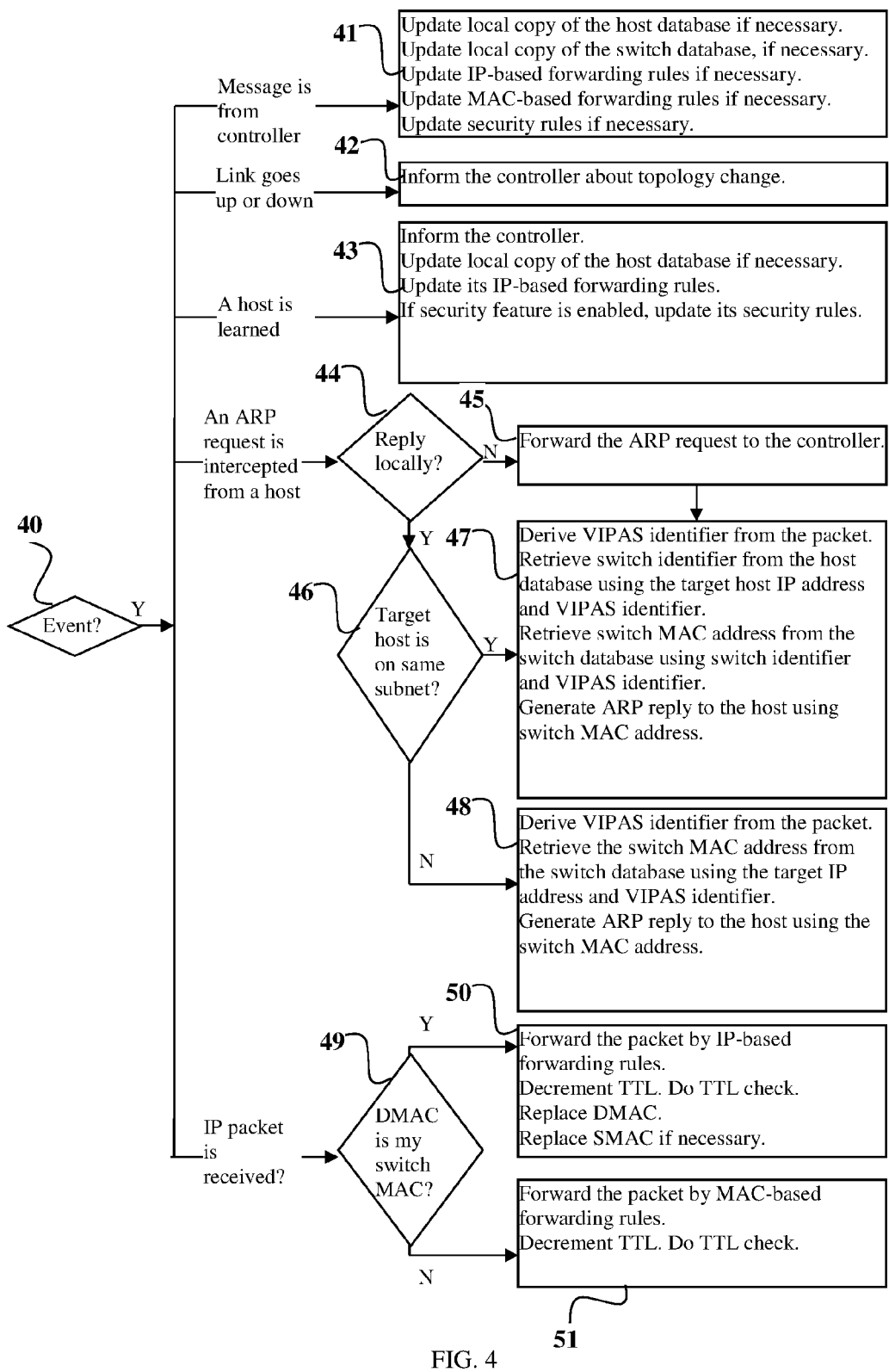
FIG. 4 illustrates an embodiment of event handling on a switch.

FIG. 4 shows an example how a switch in the switch fabric handles events. In the case of a physical switch, the switch has a driver handling some events and has a switch chip handling packet forwarding. (In the case of a virtual switch, i.e., software switch, the switch handles all events including packet forwarding in software.)

When a control message is received from the controller, as in step 41, the switch may update its local copy of the host database, its local copy of the switch database, its local IP-based forwarding rules, its local security rules, and its local MAC-based forwarding rules, if necessary.

When the switch detects a port going up or down or the appearance or disappearance of a neighbor, e.g., a LLDP neighbor, the switch informs the controller of the topology change in step 42. The switch may also react to the event, such as quickly shifting traffic from a failed port to an active port where the forwarding rules allow.

When the switch detects a host, as in step 43, it informs the controller. It may then react to the resulting control messages from the controller by step 41. Alternatively, it may update its local IP-based forwarding rules, local security rules, and local copy of the host database, if necessary. A switch may detect a host by intercepting packets from the host.

As another embodiment, it is not necessary for a switch to detect any host. When the switch intercepts ARP requests from a host and forwards them to the controller, the controller can detect the host.

When the switch intercepts an ARP request from a host, the switch should forward it to the controller as in step 45. To offload the controller from generating many ARP replies for switches in the switch fabric, as an alternative embodiment, it might be desirable to have the switch generate the ARP reply locally. Steps 47 and 48 generate ARP replies like steps 35 and 36.

When the switch receives an IP packet from a host, it performs step 50 if the destination MAC address (DMAC) of the IP packet matches a MAC address assigned to it; otherwise, performs step 51.

In step 50, the switch forwards the packet by its local IP-based forwarding rules. The packet may be discarded, forwarded to a target host, or forwarded to another switch. When a packet is forwarded to a target host or another switch, the switch replaces the DMAC of the packet by the MAC address obtained through the IP-based forwarding rules. It is desirable to decrement the time-to-live (TTL) value of the IP packet and discard the IP packet when the TTL value becomes zero. When the packet is forwarded to a host, the source MAC address (SMAC) of the IP packet can be replaced by a MAC address representative of the switch fabric. That MAC address should be a traditional MAC address, i.e., with the locally-administered bit set to 0. An example is 00:00:5e:00:01:01, which is a standard virtual router redundancy protocol (VRRP) MAC address. Another example is selecting one OUT-type MAC address of a switch in the switch fabric.

In step 51, the switch forwards the IP packet by its local MAC-based forwarding rules. There is no need to modify the DMAC and SMAC of the packet. Again, it is desirable to decrement TTL value and do a TTL check.

As an alternative embodiment, steps 50 and 51 may insert, modify, or remove an 802.1Q tag in the IP packet. The 802.1Q tag contains a Class of Service (CoS) value for quality of service (QoS) operations. More importantly, the VLAN identifier field may carry a value mapped to the VIPAS identifier at the switch identified by the DMAC. If the switch receives the packet from an attached host that is untagged, the switch inserts an 802.1Q tag, whose VLAN identifier can be mapped to the VIPAS identifier. If the switch receives the packet from an attached host that is tagged, the switch modifies the 802.1Q tag if the original VLAN identifier also serves to identify the VIPAS. The VLAN identifier of the 802.1Q tag is modified to enable mapping to the VIPAS identifier at the switch referred to by the DMAC. If the switch receives the packet from an attached host that is tagged, the switch inserts an outer 802.1Q tag if the original VLAN identifier of the (now) inner 802.1Q tag actually identifies a VLAN of the attached host because the original VLAN identifier needs to be preserved. If the switch receives a double-tagged packet that is to be forwarded to an attached target host, the switch removes the outer 802.1Q tag in the packet. If the switch receives a single-tagged packet that is to be forwarded to an attached target host, the switch modifies the 802.1Q tag in the packet with a VLAN identifier that represents the VLAN of the attached target host if the attached target host expects a tagged packet. If the switch receives a single-tagged packet that is to be forwarded to an attached target host, the switch removes the 802.1Q tag in the packet if the target host expects an untagged packet.

FIG. 5 illustrates an example of an embodiment of packet handling rules on a switch. The packet handling rules comprise security rules, MAC-based forwarding rules, and IP-based forwarding rules. The example is consistent with the setup in FIG. 1. Tables 55, 56, and 57 show some packet handling rules of switch 2 in FIG. 1.

Typical switches are capable of forwarding traffic by packet classification and performing instructions on a packet including sending out the packet on a specified port and inserting, modifying, or removing a header in the packet. The packet classification is usually performed via a Ternary Content Addressable Memory (TCAM). A TCAM consists of a number of entries, whose positions indicate the precedence of the entries. A lookup is launched on all TCAM entries. Though there may be one or more match key hits in the same lookup, the entry with higher precedence will be selected, and the resulting instructions associated with the entry will be performed on the packet. A match key can be masked. Some bits in the match key can be masked off, i.e., the values of the masked-off bits are ignored in matching. TCAM is best utilized with masked match keys. Exact match keys (unmasked match keys) can efficiently utilize non-TCAM based hash look-up. For example, table 55 can be implemented in either TCAM or hash look-up. Tables 56 and 57 can be implemented in TCAM. In tables 55, 56, and 57, the lower rule number provides a higher precedence.

The security rules in table 55 are to protect a malicious host in one VIPAS affecting hosts in another VIPAS. Rule 11 permits host 12 to only send to VIPAS 0. Rule 12 permits host 11 to only send to VIPAS 1. Rule 13 discards the packets violating the VIPAS separation.

In an alternative embodiment where VLAN identifiers are used for mapping into VIPAS identifiers, the rule 11 would become two, for example, (((DMAC & fe:00:00:00:00:ff) =02:00:00:00:00:05) && (VLAN=1) && (SMAC=00: 00:2d:12:34:56) && (IngressPort=1)) and (((DMAC & fe:00:00:00:00:ff)=02:00:00:00:00:02) && (VLAN=7) && (SMAC=00:00:2d:12:34:56) && (IngressPort=1)), assuming VLAN identifier 1 is mapped to VIPAS 0 at switch 6, and VLAN identifier 7 is mapped to VIPAS 0 at switch 3. As can be seen, the embodiment would require more security rules to protect a VIPAS.

The MAC-based forwarding rules in table 56 use masked match keys comprising destination MAC addresses (DMAC) of packets and switch MAC addresses. '&' means a bit-wise AND operation. '&&' means a logical AND operation. In rule 20, the match key comprises the switch MAC address 02:00:00:00:00:01 and the DMAC of the packet. The mask fe:ff:ff:ff:00:ff is applied to the switch MAC address and the DMAC. If the masked switch MAC address equals to the masked DMAC and the packet is an IP packet, then the resulting instructions set the VRF to 0 and further use the IP-based forwarding rules table on the packet. Because switch 2 is also assigned MAC address 02:00:00: 01:00:01 as it serves VIPAS 1 in addition to VIPAS 0, a match in rule 21 results in setting VRF to 1. Therefore, rules 20 and 21 subject a packet destined to the current switch, i.e., switch 2, to using IP-based forwarding rules. Rule 22 forwards a packet destined to switch 1 out on port 2 towards switch 1. Rule 23 forwards a packet destined to switches 3 and 4 out on port 3. The mask fe:00:00:00:00:fe helps aggregate what could be two rules into one rule, hence reducing the number of rules programmed in the table. Rule 24 forwards a packet destined to switches 5 and 6 and, if exist, switches of location identifiers '110' and '111' out on port 3. The mask fe:00:00:00:00:fc helps aggregate what could two to four rules into one rule. Table 56 shows that it is advantageous to assign topologically adjacent location identifiers to switches topologically adjacent so as to maximize the possibility of aggregating MAC-based forwarding rules into fewer rules.

The egress ports in rules 22 to 24 can be determined using a shortest path algorithm. Other path selection algorithms may be used, for example, to achieve optimal network utilization. When there is somehow a loop in the path, temporarily or unintentionally, the TTL decrement and TTL check will help discard any looped packet. Typically, in a commodity switch, the TTL decrement and TTL check function is only available when forwarding rules are implemented using TCAM.

FIG. 6 shows the effects on a packet forwarded from host 12 to host 14. Host 12 has sent an ARP request packet for target host 14 IP address 10.0.0.3. The controller has sent an ARP reply packet using switch 6 MAC address 02:00:00: 00:00:05 because host 14 has been learned on port 3 of switch 6. Therefore, packet 61 has DMAC 02:00:00:00:00: 05. The DMAC and the SMAC of packets 62 and 63 remain the same. The TTL values of packets 62 and 63 are decremented. Switch 6 uses its IP-based forwarding rules and sets packet 64 DMAC to the host 14 MAC address 00:00:2d: 42:34:ac.

The IP-based forwarding rules in table 57 use masked match keys comprising destination IP addresses (DIP) of packets, VIPAS identifiers, host IP addresses, and VIPAS IP subnets. In rule 30, the match key comprises the DIP of the packet and the VRF value derived from table 56. If the VRF value equals to 1 identifying VIPAS 1 and the DIP equals to the host 11 IP address 10.0.0.2, then the switch forwards the packet out on port 4 towards host 11, replacing the DMAC by the host 11 MAC address 00:00:3b:12:6a:3b, replacing the SMAC by the switch fabric MAC address 00:00:5e:00: 01:01, decrementing TTL, and doing TTL check. Similarly, in rule 31, if the VRF value equals to 0 identifying VIPAS 0 and the DIP equals to the host 12 IP address 10.0.0.2, then the switch forwards the packet out on port 4 towards host 12, replacing the DMAC by the host 12 MAC address 00:00: 2d:12:34:56, replacing the SMAC by the switch fabric MAC address 00:00:5e:00:01:01, decrementing TTL, and doing TTL check.

Figure 7:
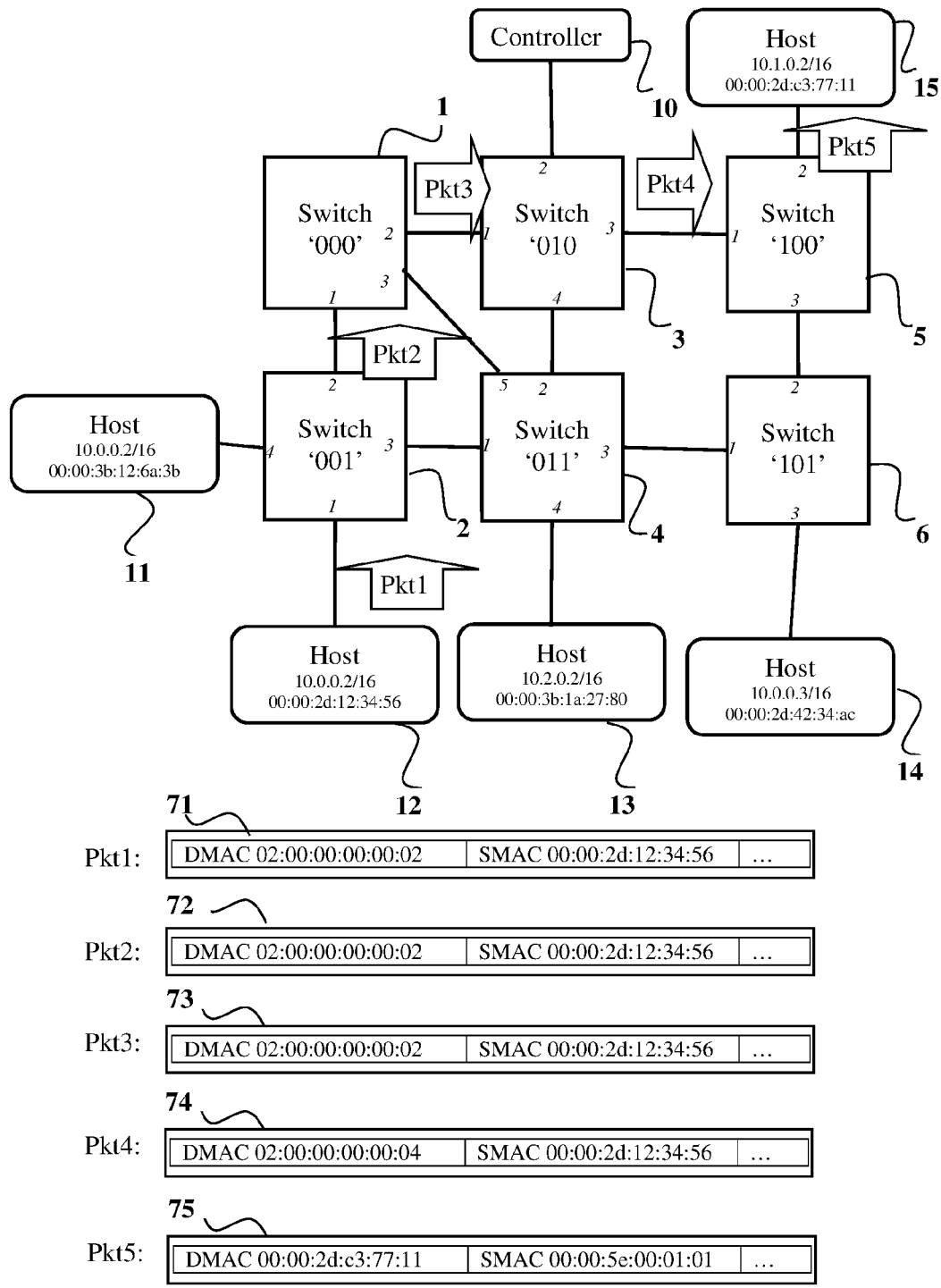
FIG. 7 illustrates the effects on a packet destined to a host on a different subnet.

In this example, switch 3 is selected to be the VIPAS 0 IP subnet router. In rule 32 of switch 2, any packet destined to not-directly-attached hosts is forwarded towards switch 3 replacing the DMAC of the packet by switch 3 MAC address 02:00:00:00:00:02. FIG. 7 illustrates how a packet is modified forwarded from host 12 to host 15. Suppose host 12 has sent an ARP request for target host (router), say, 10.0.0.1, and the controller has replied with switch 3 MAC address 02:00:00:00:00:02 because switch 3 has been selected as the VIPAS 0 subnet IP router. Therefore, packets 71, 72, and 73 all have DMAC 02:00:00:00:00:02, their TTL values decremented along the path. At switch 3, by its local IP-based forwarding rules, it forwards the packet destined to 10.1.0.2 to switch 5. Therefore, packet 74 has DMAC 02:00:00:00:

00:04. At switch 5, its local IP-based forwarding rules sets the DMAC of packet 75 to host 15 MAC address 00:00:2d: c3:77:11.

In the example of FIG. 5, switch 2 is selected to be a VIPAS 1 IP subnet router. In rule 33 of table 57, any packet destined to 10.2.0.2 is forwarded to switch 4, where host 13 is directly attached.

Switch 2 does not need to be the only VIPAS 1 IP subnet router. Now suppose there is also an IP subnet 10.3.0.0/16 in the switch fabric, and switch 1 is selected to be a second VIPAS 1 IP subnet router containing IP-based forwarding rules about hosts in 10.3.0.0/16. Then, switch 2 may have a rule matching ((VRF=1) && ((DIP & 255.255.0.0) =10.3.0.0) and directing the matched packets to switch 1 replacing DMAC by 02:00:00:01:00:00. Similarly, not all of the hosts in 10.3.0.0/16 have to be directly attached to switch 1. Switch 1 just contains IP-forwarding rules to forward the packets to the switches that have the hosts directly attached. In fact, we may even have the routes of a subnet split among multiple VIPAS IP subnet routing switches, as long as a VIPAS IP subnet routing switch is able to forward the packets that it has no specific information about to the next VIPAS IP subnet routing switch in a sequence of VIPAS IP subnet routing switches that can lead to the target hosts.

In an embodiment, a switch that has directly-attached hosts contains (host-specific) routes of the directly-attached hosts while other switches do not contain routes to those directly-attached hosts. Those directly-attached hosts may be of one or more subnets of one or more VIPAS. Suppose that there is a sender host that would like to send packets to a receiver host which is one of those directly-attached hosts. The sender host and the receiver host may of the same subnet or of different subnets or even of different VIPAS. When a sender host sends an ARP request for the VIPAS IP subnet router or for the receiver host or for the VIPAS router, the controller replies with the MAC address assigned to the switch where the receiver host is directly attached, assuming that security policies permit so. A packet from the sender host will be forwarded by the other switches to the switch based on the MAC address assigned to the switch. When the packet has reached the switch, the switch forwards the packet to the directly-attached host, i.e., the receiver host in this case, based on the (host-specific) routes of the directly-attached hosts on the switch.

The invention disclosed herein is using the disclosed switch fabric or a switch fabric of similar forwarding characteristics to redirect an IP packet from a packet redirect source to a packet redirect destination. As in FIG. 10, there is a packet redirect source (host 12) and a packet redirect destination (host 14) attached to the switch fabric. A redirected IP packet cannot be transported through the switch fabric with the forwarding rules of FIG. 5 because the destination IP address of the redirected IP packet is different from the IP address of the packet redirect destination. The packet redirect source is to perform the procedure illustrated in FIG. 8. The packet redirect source can be implemented on a host or on a switch of the switch fabric. Similarly, the packet redirect destination can be implemented on a host or on a switch of the switch fabric.

The idea is to leverage the destination MAC address field of the redirected IP packet. The packet redirect source can place information inside the destination MAC address field of a redirected packet. The information may include an identifier of the packet redirect destination such as the IP address of the packet redirect destination or a switch port directly connected to the packet redirect destination or an index representing the packet redirect destination local to the switch directly connected to the packet redirect destination, some meta-data such as the packet redirect source identity, the original TTL value of the redirected packet, etc. The switch fabric uses the information inside the destination MAC address field to locate the packet redirect destination. The packet redirect destination may also extract information from the destination MAC address field to make sense of the redirected packet.

Figure 8:
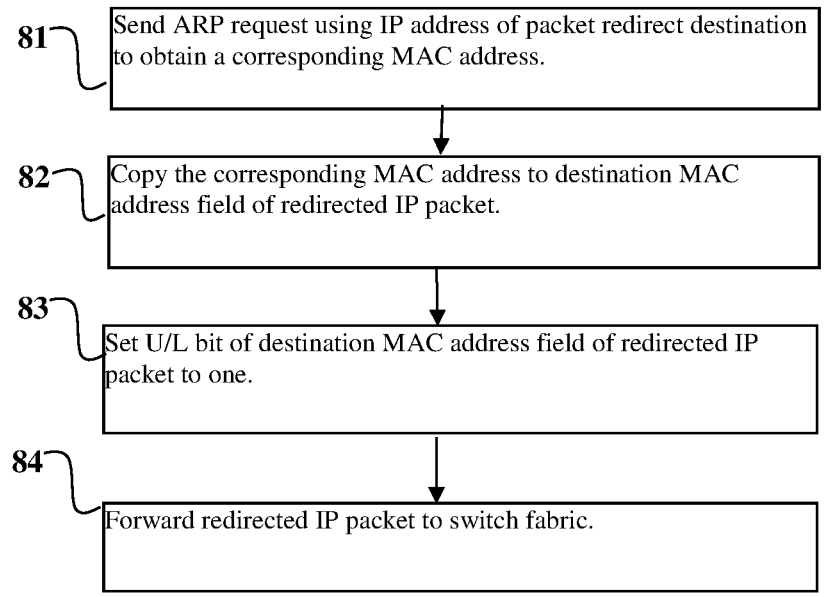
FIG. 8 illustrates an embodiment of packet redirection at a packet redirect source.

FIG. 8 illustrates an embodiment of the method performed at the packet redirect source. In step 81, the packet redirect source has an IP packet to be redirected to the packet redirect destination. Given the IP address of the packet redirect destination, the IP redirect source looks up the MAC address corresponding to that IP address from its ARP cache or sends out an ARP request so that the controller may reply with a special-formatted MAC address corresponding to that IP address. Assuming the MAC address format of FIG. 2*b*, the 1-byte location identifier is to correspond to the switch directly connected to the packet redirect destination, and the 1-byte index is to pinpoint the packet redirect destination among a set of packet redirect destinations local to the switch. The index values can be arbitrary but must uniquely identify each packet redirect destination local to the switch. It is possible that multiple packet redirect destinations are connected to the same port of the switch; in that case, the indexes cannot simply be port identifiers. In our preferred embodiment, each of the indexes can indicate an egress port and a MAC address. The egress port is the port directly connected to the packet redirect destination. The egress port can be a link aggregation comprising one or more physical ports. The MAC address is used for replacing the destination MAC address of the redirected IP packet before sending the redirected IP packet out the egress port. That MAC address can be a traditional MAC address of the packet redirect destination. In the case of multiple packet redirect destinations connected to the same egress port, that MAC address enables the intended packet redirect destination to let in the redirected IP packet based on the destination MAC address of the packet. In the case that there is only a single packet redirect destination connected to one port and the packet redirect destination can let in a packet regardless of the destination MAC address of the packet, there is no need to put the MAC address of the packet redirect destination in the destination MAC address field of the packet at the switch directly connected to the packet redirect destination.

In step 82, the packet redirect source puts the MAC address provided by the controller into the destination MAC address field of the redirected IP packet. That enables the switch fabric to forward the packet according to the location identifier bits of the destination MAC address field to the switch that is directly connected the packet redirect destination.

In step 83, the packet redirect source sets the U/L bit, i.e., bit[41], of the destination MAC address field of the IP packet to one, if the MAC address provided by the controller has not already had the U/L bit set to one. Setting that bit to one serves as an indication that the destination MAC address of the packet has special meaning.

In one embodiment, the packet redirect source sets the TTL field of the packet to 255 or a number no less than the expected number of switches through the switch fabric from the packet redirect source to the packet redirect destination. (IP checksum may also be updated.) The switch fabric is supposed to decrement the TTL value of the packet when forwarding the packet from switch to switch. Setting the TTL value to a large number ensures that the redirected packet will not be dropped due to a small original TTL value.

In step 84, the packet redirect source sends out the modified packet to the switch fabric.

Figure 10:
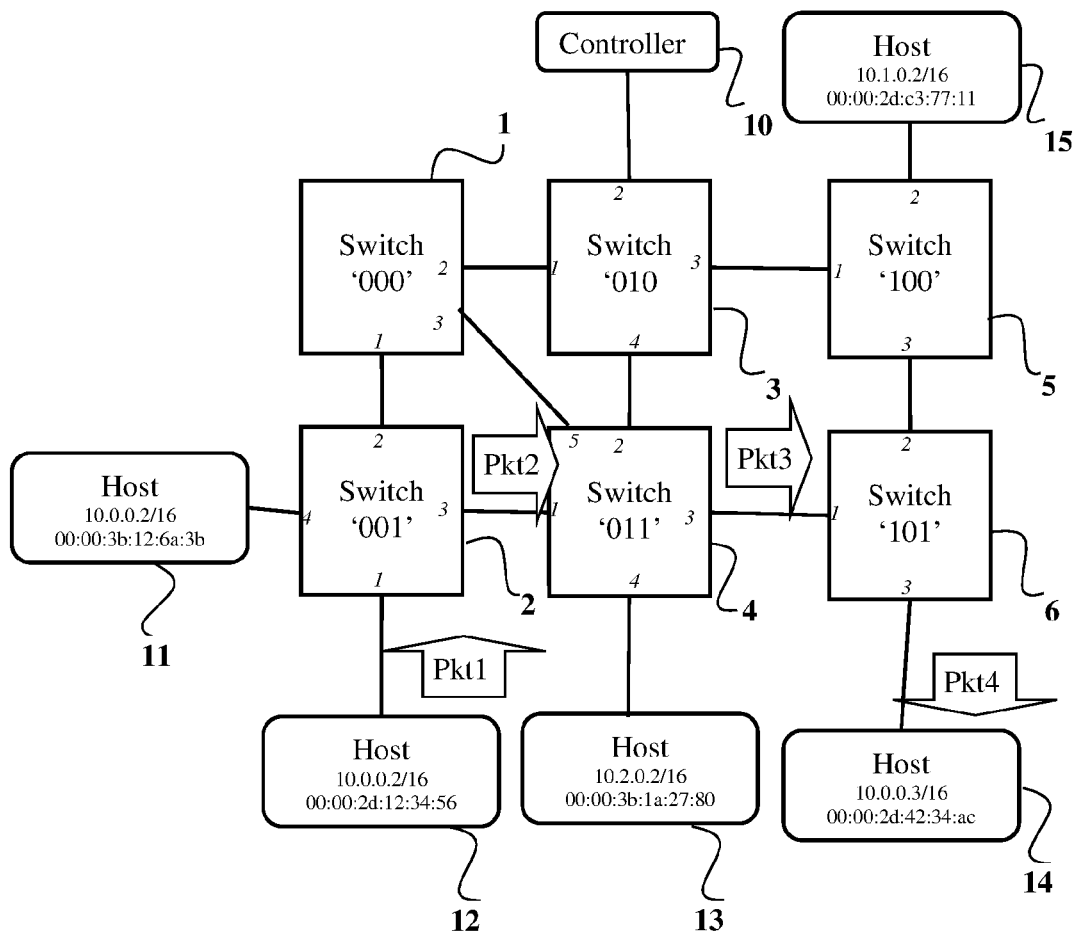
FIG. 10 illustrates the effects on a redirected packet from a packet redirect source to a packet redirect destination.

FIG. 9 illustrates an embodiment of packet handling rules pertaining packet redirection. It is an example of packet handling rules implemented on switch 6 of FIG. 10. In FIG. 10, host 12 is the packet redirect source and host 14 is the packet redirect destination. Switch 6 is the switch directly connected to the packet redirect destination. Host 12 has received 02:00:00:00:01:05 from the controller in reply to its ARP request for 10.0.0.3, the IP address of host 14. The IP addresses in packets 105-108 are irrelevant in forwarding decisions in packet redirection case. When host 12 sends the packet 105 to switch 2, the destination MAC address value is 02:00:00:00:01:05. Rule 15 of the MAC-based forwarding rules table of FIG. 9 forwards the redirected IP packet to host 14. For packet redirection, the VIPAS identifier may be considered as irrelevant depending on the use case; if so, the VIPAS identifier can be masked out in the destination MAC address matching as in rule 15. There could be multiple packet redirect destinations on switch 6, and a match at rule 15 indicates host 14 to be the intended packet redirect destination. The egress port 3 is identified and the traditional MAC address 00:00:2d:42:34:ac of host 14 is put in the destination MAC address field of the packet. The rules for handling packet redirection must have higher execution priority values (lower rule numbers) than the rules for handling switch-to-switch forwarding (e.g., rules 26-28). The latter rules mask out the index bits in match key and, therefore, have less specific match keys than the former rules.

In FIG. 10, the destination MAC address of packet 105 sent from host 12 is 02:00:00:00:01:05, where the location identifier bits correspond to switch 6. The source MAC address of packet 105 is 00:00:00:11:22:33. In our preferred embodiment, the source MAC address of the redirected IP packet can be different from the traditional MAC address of the packet redirect source, host 12. In this example, 00:00:00:11:22:33 is just the source MAC address of the packet when the packet redirect source (host 12) captures or generates the packet. In FIG. 10, we do not show how host 12 captures or generates the packet. In practice, host 12 could be connected to another network from which host 12 extracts the packet. The source MAC address may have special meanings to the packet redirect destination. The source MAC address could be crafted by the packet redirect source or by other devices connected to the packet redirect source not shown in FIG. 10. The switch fabric is not to alter the source MAC address when transporting the packet from the packet redirect source to the packet redirect destination. The switch fabric does not need to understand the meanings of the source MAC address. In contrast, the switch fabric may alter the source MAC address of a non-redirected packet when transporting the non-redirected packet. As illustrated in FIG. 2b, we may use index value 0 to indicate non-redirected packets and non-zero index values to indicate redirected packets. On switch 2, a security rule has to be set up to allow the redirected packet whose source MAC address is not the MAC address of host 12. On switches 2 and 4, the packet is forwarded according to the location identifier bits of the destination MAC address of the packet. By the instructions of rule 15 of FIG. 9, at switch 6, the destination MAC address of packet 108 is changed to the MAC address of the host 14. That enables host 14 to let in the redirected packet.

The embodiments described above are illustrative examples and it should not be construed that the present invention is limited to these particular embodiments. Thus, various changes and modifications may be effected by one skilled in the art without departing from the spirit or scope of the invention as defined in the appended claims.

The invention claimed is:

1. A method for redirecting an Internet Protocol (IP) packet from a packet redirect source to a packet redirect destination through a switch fabric, the method comprising:
   at said packet redirect source, copying a switch identifier of a switch of said switch fabric to a first subset of bits of a destination Media Access Control (MAC) address field of said IP packet, wherein said switch of said switch fabric is directly connected to said packet redirect destination;
   at said packet redirect source, copying an index to a second subset of bits of said destination MAC address field of said IP packet, wherein said index at least indicates a port of said switch of said switch fabric, wherein said port of said switch is directly connected to said packet redirect destination;
   in said switch fabric, forwarding said IP packet from said packet redirect source to said switch of said switch fabric according to said first subset of bits of said destination MAC address field of said IP packet; and
   at said switch of said switch fabric, forwarding said IP packet out on said port of said switch according to said second subset of bits of said destination MAC address field of said IP packet.

2. The method of claim 1, the method further comprising, at said switch of said switch fabric, copying a MAC address of said packet redirect destination to said destination MAC address field of said IP packet according to said second subset of bits of said destination MAC address field of said IP packet.

3. The method of claim 1, wherein said forwarding said IP packet from said packet redirect source to said switch of said switch fabric does not alter a source MAC address field of said IP packet.

4. The method of claim 1, wherein said switch identifier of said switch of said switch fabric represents a topological location of said switch within said switch fabric.

5. The method of claim 1, wherein said port of said switch of said switch fabric is a link aggregation comprising one or more physical ports.

6. The method of claim 1, the method further comprising, at said packet redirect source, setting a universal/local (U/L) bit of said destination MAC address field of said IP packet to one.

7. The method of claim 1, the method further comprising, at said packet redirect source, setting a Time-To-Live (TTL) field of said IP packet to a value no less than an expected number of switches through said switch fabric from said packet redirect source to said packet redirect destination.

8. The method of claim 1, the method further comprising, in said switch fabric, decrementing a value of a TTL field of said IP packet at each switch through said switch fabric from said packet redirect source to said packet redirect destination.

9. A computer program product comprising a non-transitory computer readable storage media having stored thereupon computer program code including a set of processor based instructions for redirecting an Internet Protocol (IP) packet from a packet redirect source to a packet redirect destination through a switch fabric, the computer program code, when being executed by a computer, causes:
   instructing said packet redirect source to copy a switch identifier of a switch of said switch fabric to a first subset of bits of a destination Media Access Control (MAC) address field of said IP packet, wherein said switch of said switch fabric is directly connected to said packet redirect destination;

instructing said packet redirect source to copy an index to a second subset of bits of said destination MAC address field of said IP packet, wherein said index at least indicates a port of said switch of said switch fabric, wherein said port of said switch is directly connected to said packet redirect destination;

instructing said switch fabric to forward said IP packet from said packet redirect source to said switch of said switch fabric according to said first subset of bits of said destination MAC address field of said IP packet; and instructing said switch of said switch fabric to forward said IP packet out on said port of said switch according to said second subset of bits of said destination MAC address field of said IP packet.

10. The computer program product of claim 9, wherein said computer program code further causes instructing said switch of said switch fabric to copy a MAC address of said packet redirect destination to said destination MAC address field of said IP packet according to said second subset of bits of said destination MAC address field of said IP packet.

11. The computer program product of claim 9, wherein said switch fabric does not alter a source MAC address field of said IP packet when said switch fabric forwards said IP packet from said packet redirect source to said switch of said switch fabric.

12. The computer program product of claim 9, wherein said switch identifier of said switch of said switch fabric represents a topological location of said switch within said switch fabric.

13. The computer program product of claim 9, wherein said port of said switch of said switch fabric is a link aggregation comprising one or more physical ports.

14. The computer program product of claim 9, wherein said computer program code further causes instructing said switch fabric to decrement a value of a TTL field of said IP packet at each switch through said switch fabric from said packet redirect source to said packet redirect destination.

15. A system including a controller for redirecting an Internet Protocol (IP) packet, the system comprising:

a packet redirect source;
a packet redirect destination; and
a switch fabric including a plurality of switches,
wherein said packet redirect source copies a switch identifier of a switch of said switch fabric to a first subset of bits of a destination Media Access Control (MAC) address field of said IP packet, wherein said switch of said switch fabric is directly connected to said packet redirect destination;
wherein said packet redirect source copies an index to a second subset of bits of said destination MAC address field of said IP packet, wherein said index at least indicates a port of said switch of said switch fabric, wherein said port of said switch is directly connected to said packet redirect destination;
wherein switch fabric forwards said IP packet from said packet redirect source to said switch of said switch fabric according to said first subset of bits of said destination MAC address field of said IP packet; and
wherein said switch of said switch fabric forwards said IP packet out on said port of said switch according to said second subset of bits of said destination MAC address field of said IP packet.

16. The system of claim 15, wherein said switch of said switch fabric copies a MAC address of said packet redirect destination to said destination MAC address field of said IP packet according to said second subset of bits of said destination MAC address field of said IP packet.

17. The system of claim 15, wherein said switch fabric does not alter a source MAC address field of said IP packet when said switch fabric forwards said IP packet from said packet redirect source to said switch of said switch fabric.

18. The system of claim 15, wherein said switch identifier of said switch of said switch fabric represents a topological location of said switch within said switch fabric.

19. The system of claim 15, wherein said port of said switch of said switch fabric is a link aggregation comprising one or more physical ports.

20. The system of claim 15, wherein said switch fabric decrements a value of a TTL field of said IP packet at each switch through said switch fabric from said packet redirect source to said packet redirect destination.

* * * * *